(12) United States Patent
Kao

(10) Patent No.: US 6,321,644 B1
(45) Date of Patent: Nov. 27, 2001

(54) JUICER/JUICE EXTRACTOR

(76) Inventor: I-Feng Kao, No. 200, Shi-Ho Road, West District, Tainan (TW)

( * ) Notice: Subject to any disclaimer, the term of this patent is extended or adjusted under 35 U.S.C. 154(b) by 0 days.

(21) Appl. No.: 09/864,706

(22) Filed: May 23, 2001

(51) Int. Cl.[7] .............. A23L 1/00; A47J 43/14; B30B 9/06

(52) U.S. Cl. .............. 100/125; 99/495; 99/506; 99/508; 100/213; 100/283; D7/666

(58) Field of Search .............. 99/495, 501–508; 100/110, 125, 131–135, 213, 283; D7/665, 666

(56) References Cited

U.S. PATENT DOCUMENTS

| | | | |
|---|---|---|---|
| D. 370,837 | * | 6/1996 | Lee .............. D7/666 |
| 385,851 | * | 7/1888 | Easley .............. 99/508 X |
| D. 422,184 | * | 4/2000 | Kao .............. D7/666 |
| 2,142,975 | * | 1/1939 | Majewski, Jr. .............. 99/506 X |
| 2,204,964 | * | 6/1940 | Koch .............. 99/506 X |
| 2,220,372 | * | 11/1940 | Johnson .............. 99/508 X |
| 2,588,906 | * | 3/1952 | Clark .............. 100/125 X |
| 2,589,724 | * | 3/1952 | Miller .............. 100/125 |
| 2,591,162 | * | 4/1952 | Kircher .............. 100/125 |
| 2,624,271 | * | 1/1953 | Johnson .............. 100/213 X |
| 2,655,862 | * | 10/1953 | Mitnick .............. 100/125 |
| 5,970,859 | * | 10/1999 | Lee .............. 99/507 |

* cited by examiner

Primary Examiner—Timothy F. Simone
(74) Attorney, Agent, or Firm—Alan Kamrath; Rider, Bennett, Egan & Arundel, LLP

(57) ABSTRACT

A juicer/extractor comprises a base, a drip cup supported by the base, a vertical rod having a lower end located above the drip cup and movable along a vertical direction, a column extending upward from the base and including a portion for supporting the vertical rod and allowing vertical movement of the vertical rod, a juicing device for extracting juice from citrus, and a pressing device for extracting juice from fruit without peel, rootstock, or vegetable. One of the juicing device and the pressing device is selected and is releasably mounted between the lower end of the vertical rod and the drip cup.

8 Claims, 10 Drawing Sheets

JUICER/JUICE EXTRACTOR

BACKGROUND OF THE INVENTION

1. Field of the Invention

The present invention relates to a juicer/juice extractor, and more particularly to a dual function juicer/juice extractor that can be used as either a juicer for extracting juice from fruit with peel or a juice extractor for extracting juice from fruit without peel, rootstock, or vegetable.

2. Description of the Related Art

A juice extractor is used to extract juice from fruit without peel (such as apples, pineapples, kiwis, etc.), rootstock, or vegetable. However, the juice extractor cannot be used to extract juice from fruit with peel (i.e., citrus) such as oranges, grapefruits, lemons, etc., as the juice extracted will taste bitter. A juicer is generally used to extract juice from citrus, but it cannot be used to extract juice from fruit without peel, rootstock, or vegetable. Thus, the users must buy both a juice extractor and a juicer, which is uneconomic.

SUMMARY OF THE INVENTION

It is an object of the present invention to provide a juicer/juice extractor that can be used as either a juicer for extracting juice from fruit with peel or a juice extractor for extracting juice from fruit without peel, rootstock, or vegetable, thereby saving the cost.

A juicer/extractor in accordance with the present invention comprises:
- a base;
- a drip cup supported by the base;
- a vertical rod having a lower end located above the drip cup;
- means for moving the vertical rod along a vertical direction;
- a column extending upward from the base and including a portion for supporting the vertical rod and allowing vertical movement of the vertical rod;
- a juicing device for extracting juice from citrus; and
- a pressing device for extracting juice from fruit without peel, rootstock, or vegetable;
- one of the juicing device and the pressing device being releasably mounted between the lower end of the vertical rod and the drip cup.

The juicing device comprises a reamer mounted above the drip cup and a pressure cup having a lower end above the reamer and an upper end releasably engaged with the lower end of the vertical rod. The lower end of the vertical rod comprises an outer threading and the upper end of the pressure cup includes an inner threading for engaging with the outer threading of the lower end of the vertical rod.

The pressing device comprises a dripping plate mounted on top of the drip cup and a pressing plate having a lower side above the dripping plate and an upper side releasably engaged with the lower end of the vertical rod. The lower end of the vertical rod comprises an outer threading. The pressing plate comprises an engaging stem extending from the upper side thereof The engaging stem includes an end having an inner threading for engaging with the outer threading of the lower end of the vertical rod. The lower side of the pressing plate comprises a plurality of annular ribs formed thereon. The dripping plate comprises a plurality of rows of recessed sections each having a plurality of dripping holes communicated with the drip cup A strainer cone surrounds at least a lower portion of the engaging stem to thereby prevent splashing of juice.

Other objects, advantages, and novel features of the invention will become more apparent from the following detailed description when taken in conjunction with the accompanying drawings.

DETAILED DESCRIPTION OF THE PREFERRED EMBODIMENT

In order to provide a better understanding of the present invention, a conventional juicer will be described with reference to FIGS. 1 through 6 of the drawings.

Figure 1:
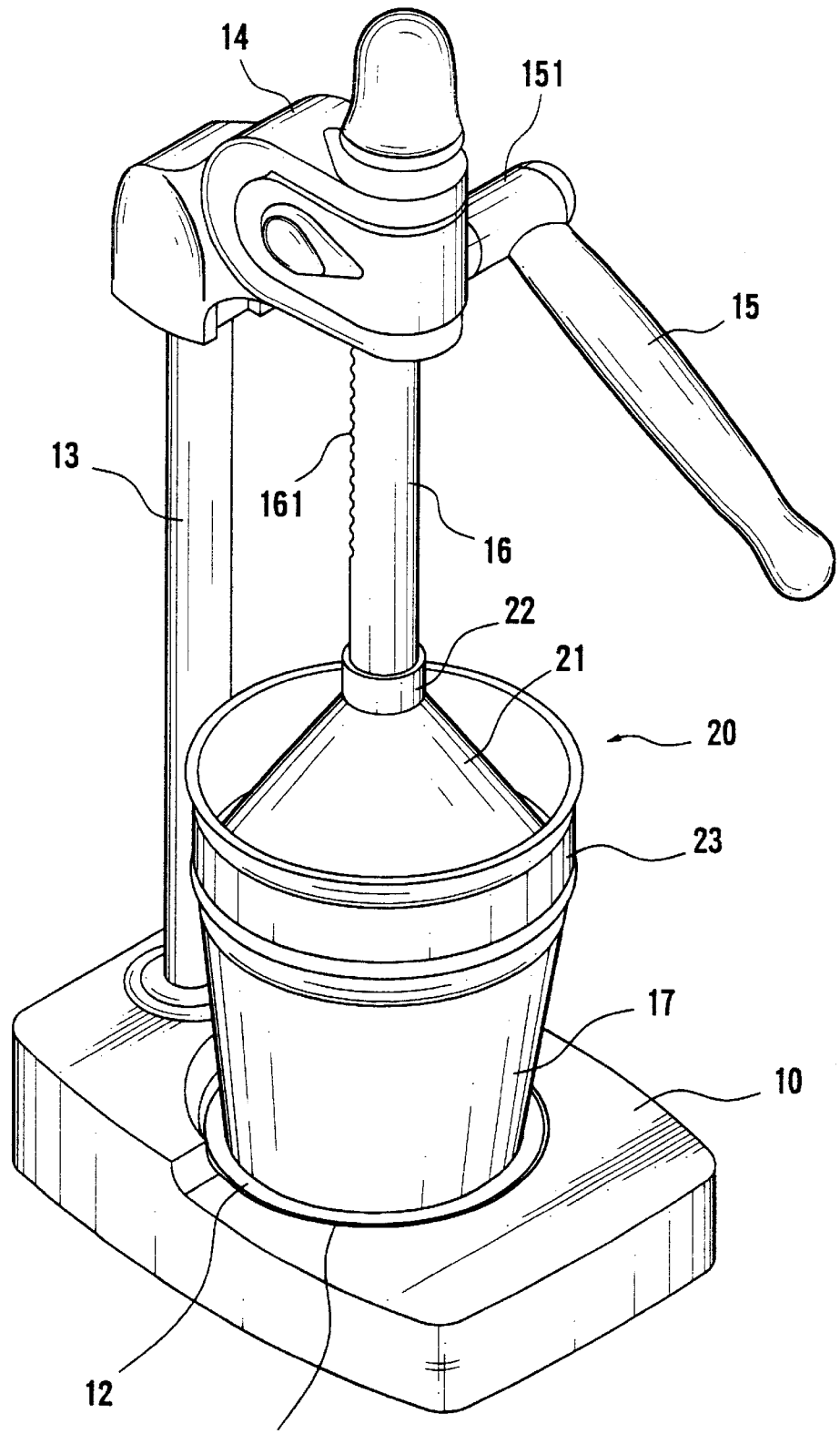
FIG. 1 is a perspective view of a conventional juicer.
Figure 2:
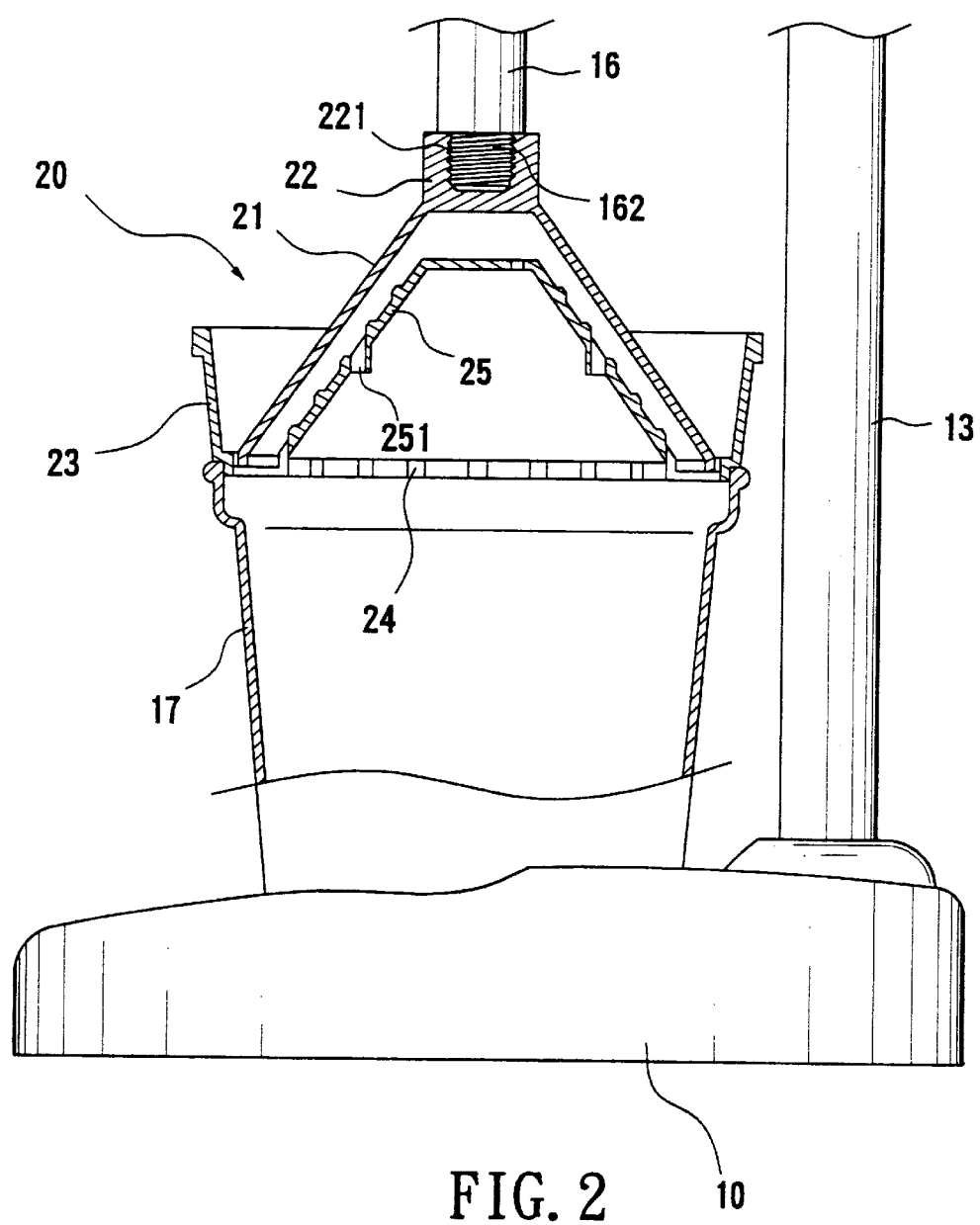
FIG. 2 is a side view, partly sectioned, of a lower portion of the conventional juicer.

FIG. 1 of the drawings illustrates a typical juicer. The juicer, as illustrated in FIGS. 1 and 2, the juicer comprises a base 10 with a recess 11 in which a soft pad 12 is received for supporting a drip cup 17. A column 13 extends upward from a rear of the base 10 and includes a head 14 on a top thereof a handle 15 has an end 151 pivotally connected to the head 14 and having a spindle (not shown) mounted thereon. A gear (not shown) is mounted to the spindle to rotate therewith. A vertical rod 16 has a portion housed in the head 14 and includes a rack 161 formed on a side thereof the rack 161 meshing with the gear. Thus, the vertical rod 16 is moved vertically when the handle 15 is pivoted.

Figure 3:
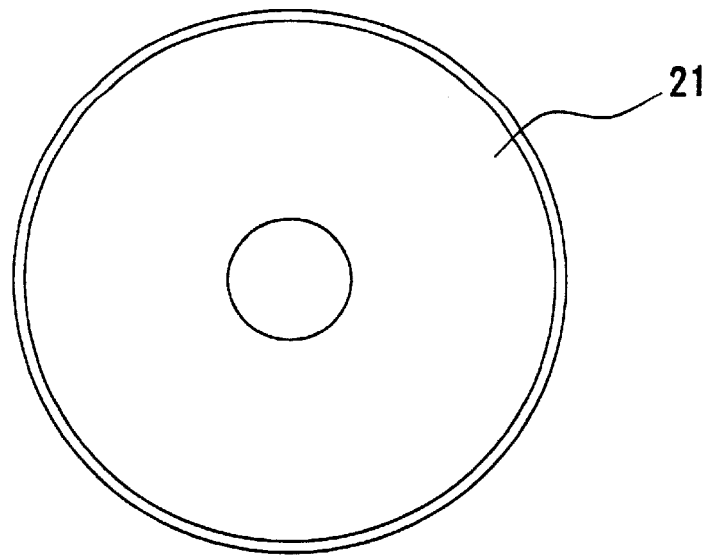
FIG. 3 is a bottom view of a pressure cup of the conventional juicer.
Figure 4:
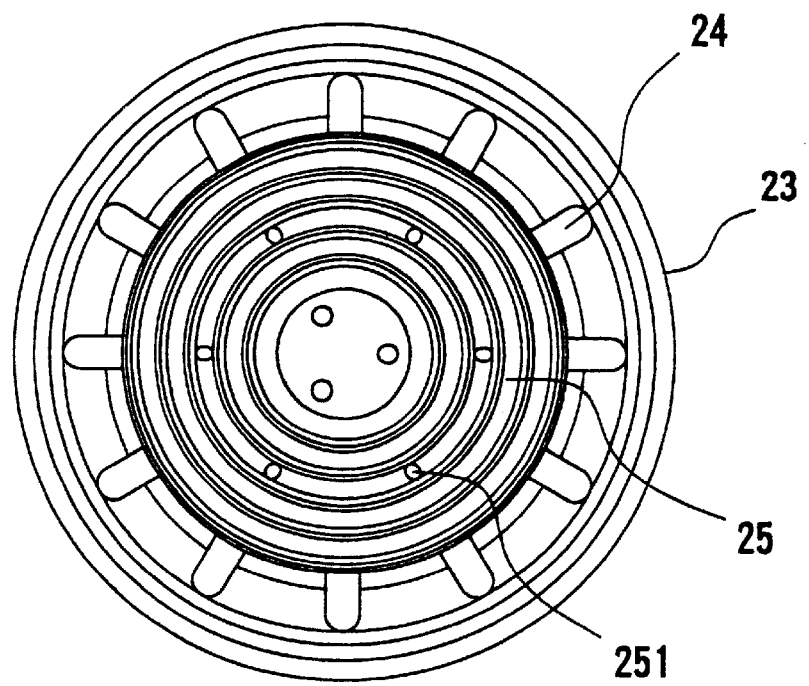
FIG. 4 is a top view of a reamer and a strainer cone of the conventional juicer.

As illustrated in FIG. 2, a juicing device 20 is mounted between the vertical rod 16 and the drip cup 17. The juicing device 20 includes a conic pressure cup 21 having a top 22 with an inner threading 221 for threading engagement with a lower threaded end 162 of the vertical rod 16. The juicing device 20 further includes a strainer cone 23 mounted on top of the drip cup 17 and a reamer 25 mounted above the drip cup 17 and including a plurality of holes 251 in a conic portion thereof and a plurality of holes 24 in a planar portion thereof The strainer cone 33 is preferably integral with the dripping plate 34 and rests on top of the drip cup 17. FIG. 3 is a bottom view of the pressure cup 21 and FIG. 4 is a top view of the strainer cone 23 and the reamer 25.

Figure 5:
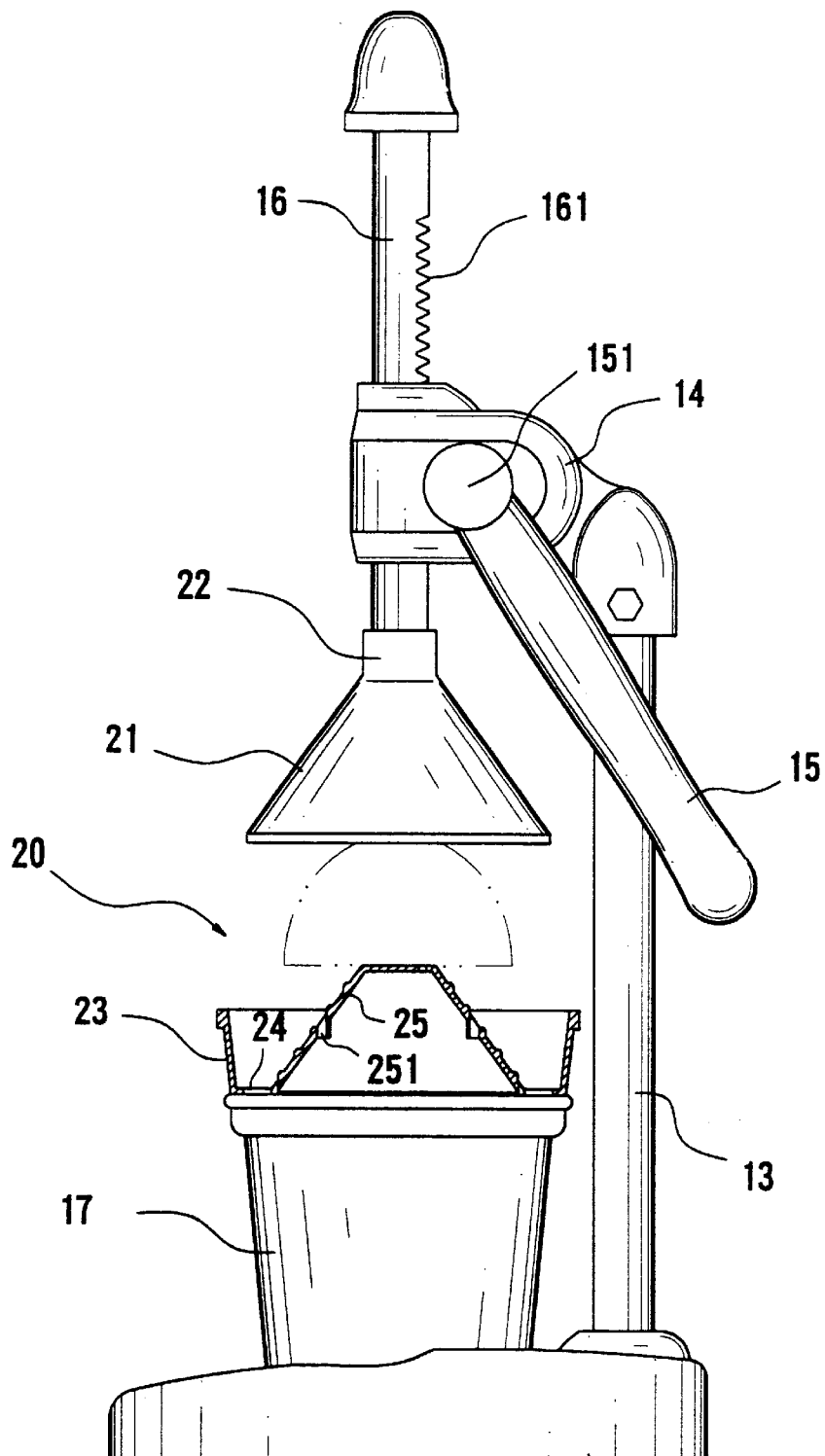
FIG. 5 is a side view, partly sectioned, of the conventional juicer.
Figure 6:
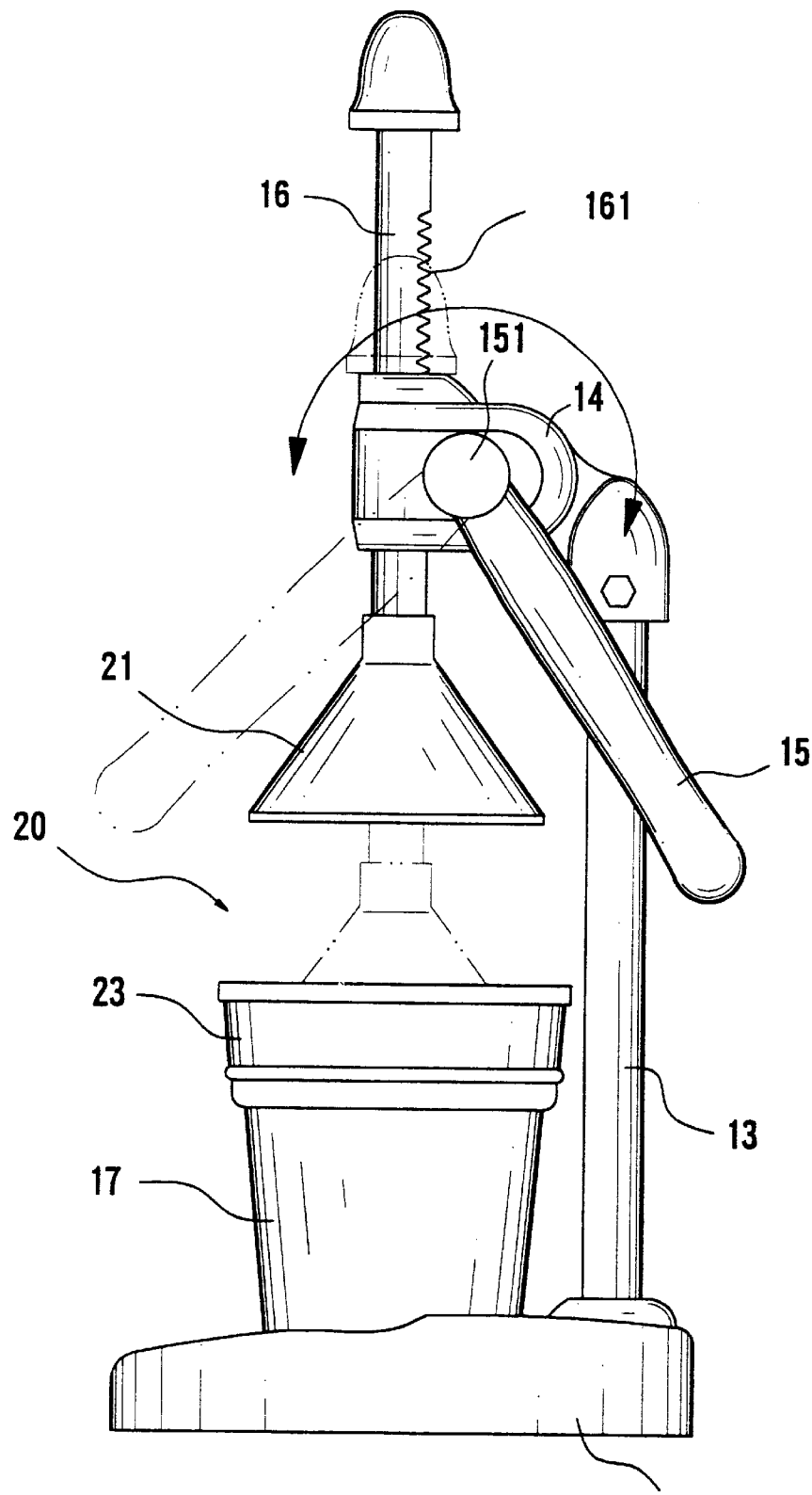
FIG. 6 is a side view similar to FIG. 5, illustrating operation of the conventional juicer

In use, as illustrated in FIG. 5, fruit with peel (i.e., citrus) is placed on top of the reamer 25 and the handle 15 is then pivoted to move the vertical rod 16 downward. The pressure cup 21 is moved downward toward the fruit with peel and thus extract juice from the fruit, as shown in FIG. 6. The extracted juice flows into the drip cup 17 via the holes 251 and 24 in the reamer 25.

However, such a juicer cannot be used to extract juice from fruit without peel (such as apples, pineapples, kiwis, etc.), rootstock, or vegetable.

Referring to FIGS. 7 through 12, the present invention provides a juice extractor for extracting juice from fruit without peel (such as apples, pineapples, kiwis, etc.), rootstock, or vegetable. The juicer illustrated in FIG. 1 through 6 can be easily converted into the juice extractor in accordance with the present invention by means of simple replacement of the juicing device 20 with a juice-pressing device 30 in accordance with the present invention.

Hereinafter, the juice extractor in accordance with the present invention will be described with reference to FIGS. 7 through 12.

Figure 7:
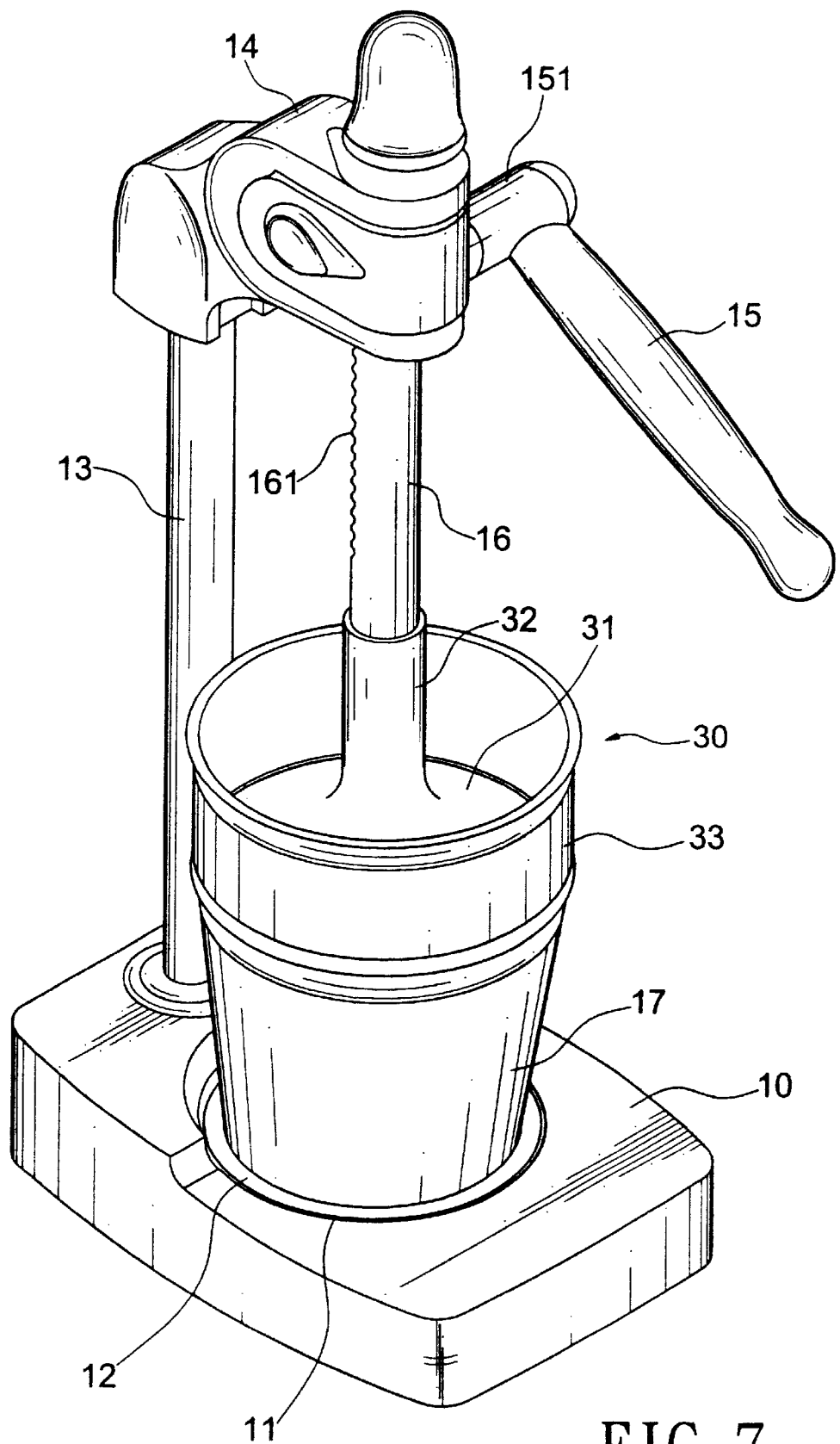
FIG. 7 is a perspective view of a juice extractor in accordance with the present invention.
Figure 8:
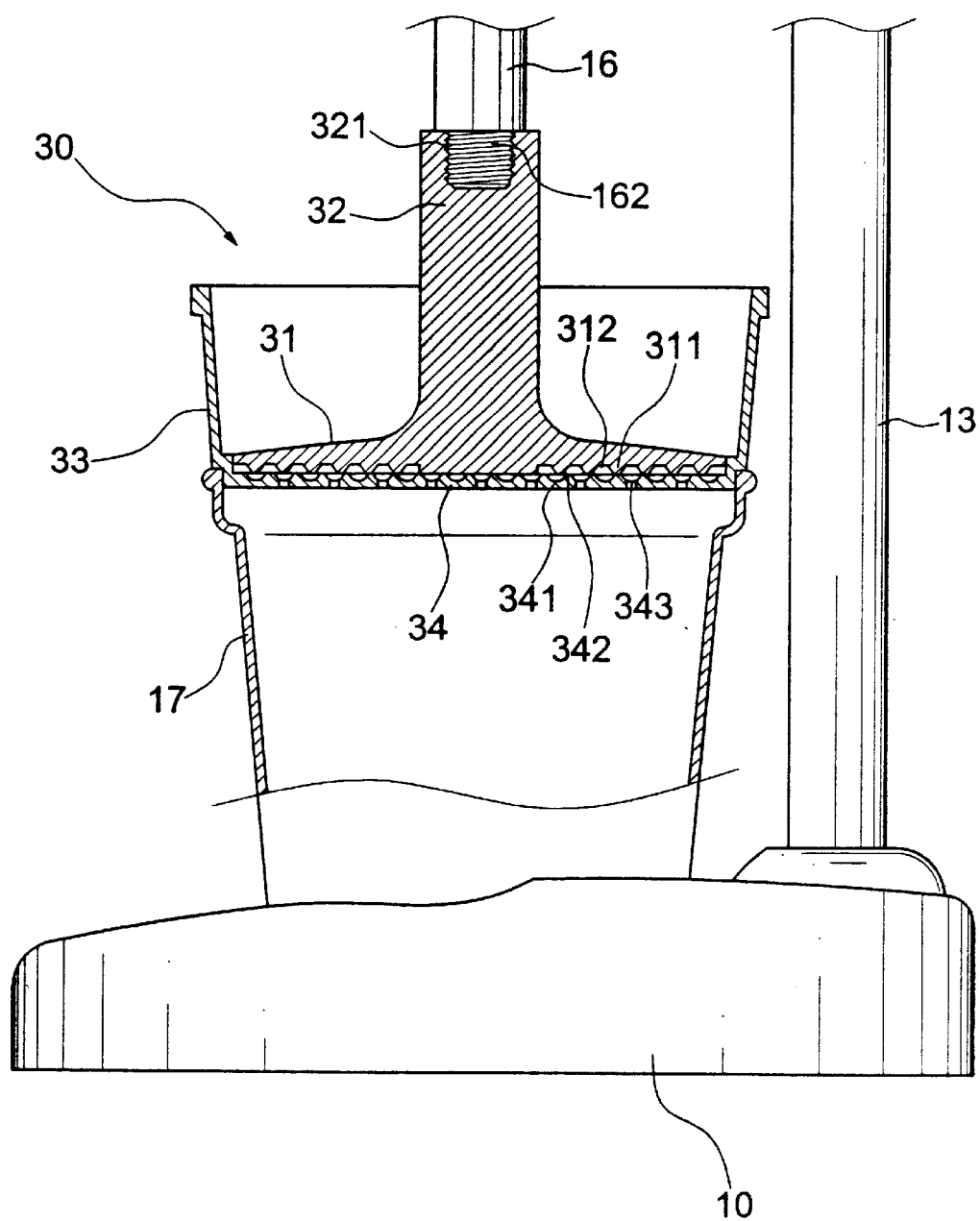
FIG. 8 is a side view, partly sectioned, of a lower portion of the juice extractor in accordance with the present invention.
Figure 9:
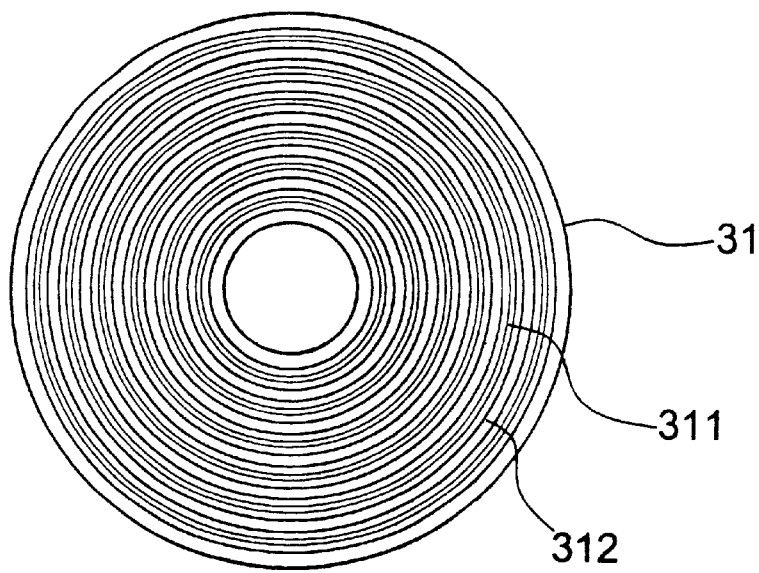
FIG. 9 is a bottom view of a pressure plate of the juice extractor in accordance with the present invention.
Figure 10:
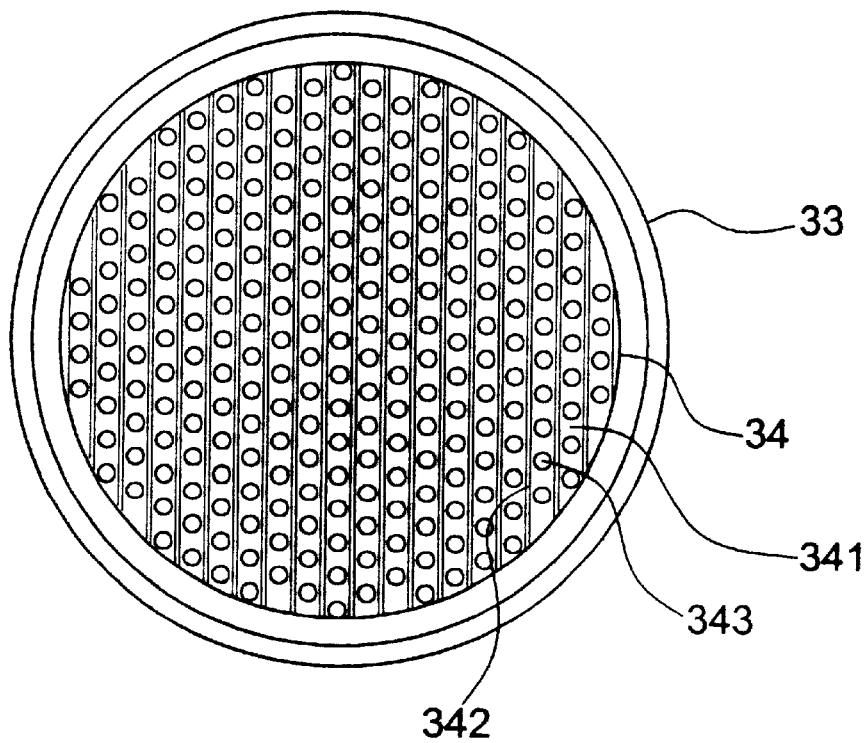
FIG. 10 is a top view of a dripping plate of the juice extractor in accordance with the present invention.

Referring to FIGS. 7 and 8, similar to the juicer illustrated in FIGS. 1 through 6, a juice extractor in accordance with the present invention generally comprises a base 10 with a recess 11 in which a soft pad 12 is received for supporting a drip cup 17. A column 13 extends upward from a rear of the base 10 and includes a head 14 on a top thereof A handle 15 has an end 151 pivotally connected to the head 14 and having a spindle (not shown) mounted thereon. A gear (not shown) is mounted to the spindle to rotate therewith. A vertical rod 16 has a portion housed in the head 14 and includes a rack 161 formed on a side thereof, the rack 161 meshing with the gear. Thus, the vertical rod 16 is moved vertically when the handle 15 is pivoted.

As illustrated in FIG. 8, a pressing device 30 for extracting juice from fruit without peel (such as apples, pineapples, kiwis, etc.), rootstock, or vegetable is mounted between the vertical rod 16 and the drip cup 17. The pressing device 30 includes a pressure plate 31 and a dripping plate 34. An engaging stem 32 extends from a side of the pressure plate 31 and includes an end with an inner threading 321 for threading engagement with a lower threaded end 162 of the vertical rod 16. A strainer cone 33 may be mounted on top of the drip cup 17 and surround at least a lower portion of the engaging stem 32 to thereby prevent splashing of the juice. The strainer cone 33 is preferably integral with the dripping plate 34 and rests on top of the drip cup 17, best shown in FIG. 8. A plurality of concentric annular ribs 311 is formed on the other side of the pressure plate 31, thereby forming a plurality of concentric annular grooves 312 between the annular ribs 311, best shown in FIG. 9. The dripping plate 34 is mounted in or above the drip cup 17 and includes a plurality of rows of recessed sections 341 each having a plurality of dripping holes 343 defined therein. A ridge 342 is defined between each two adjacent recessed sections 341, best shown in FIG. 10.

Figure 11:
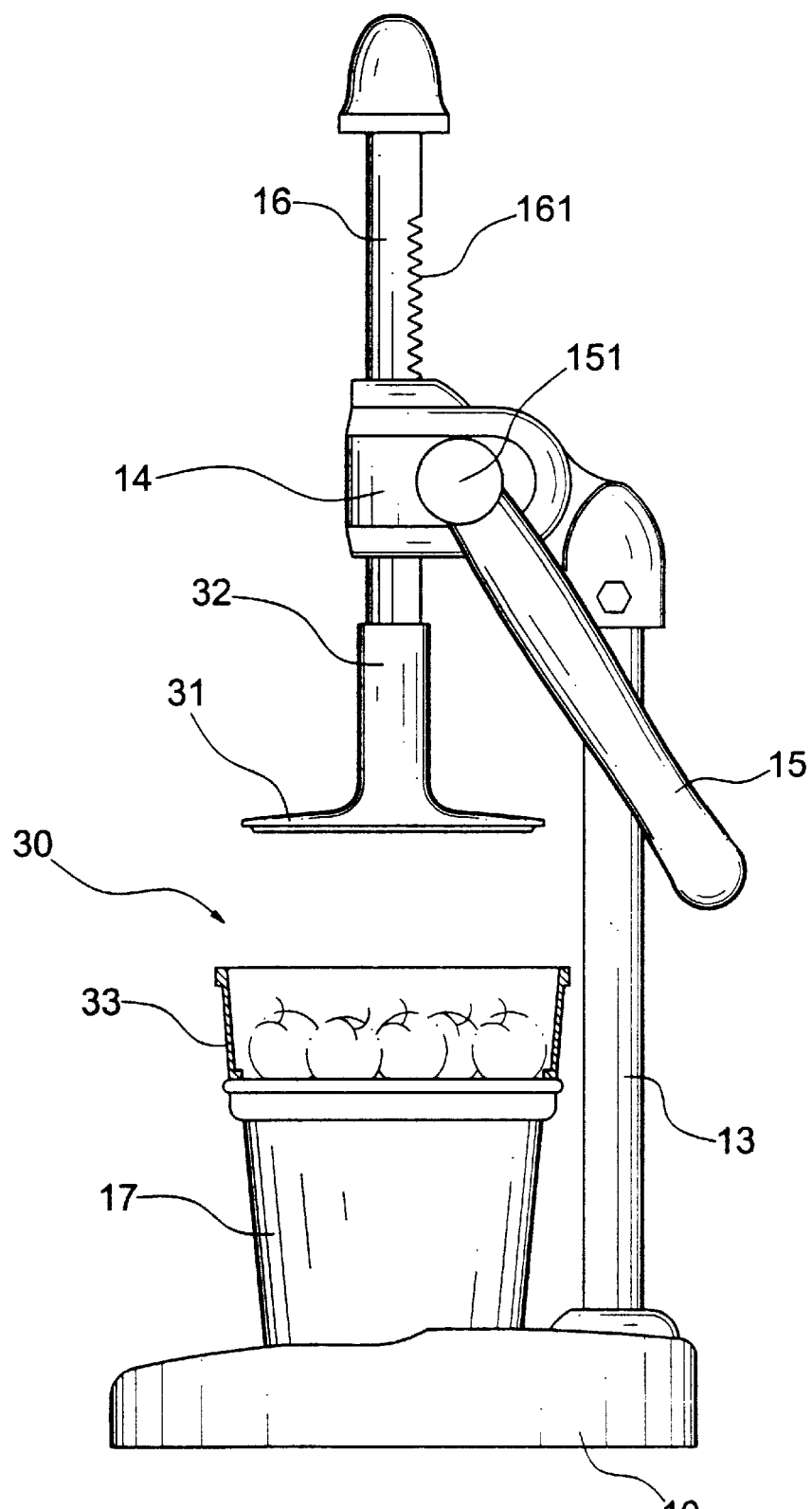
FIG. 11 is a side view, partly sectioned, of the juice extractor in accordance with the present invention.
Figure 12:
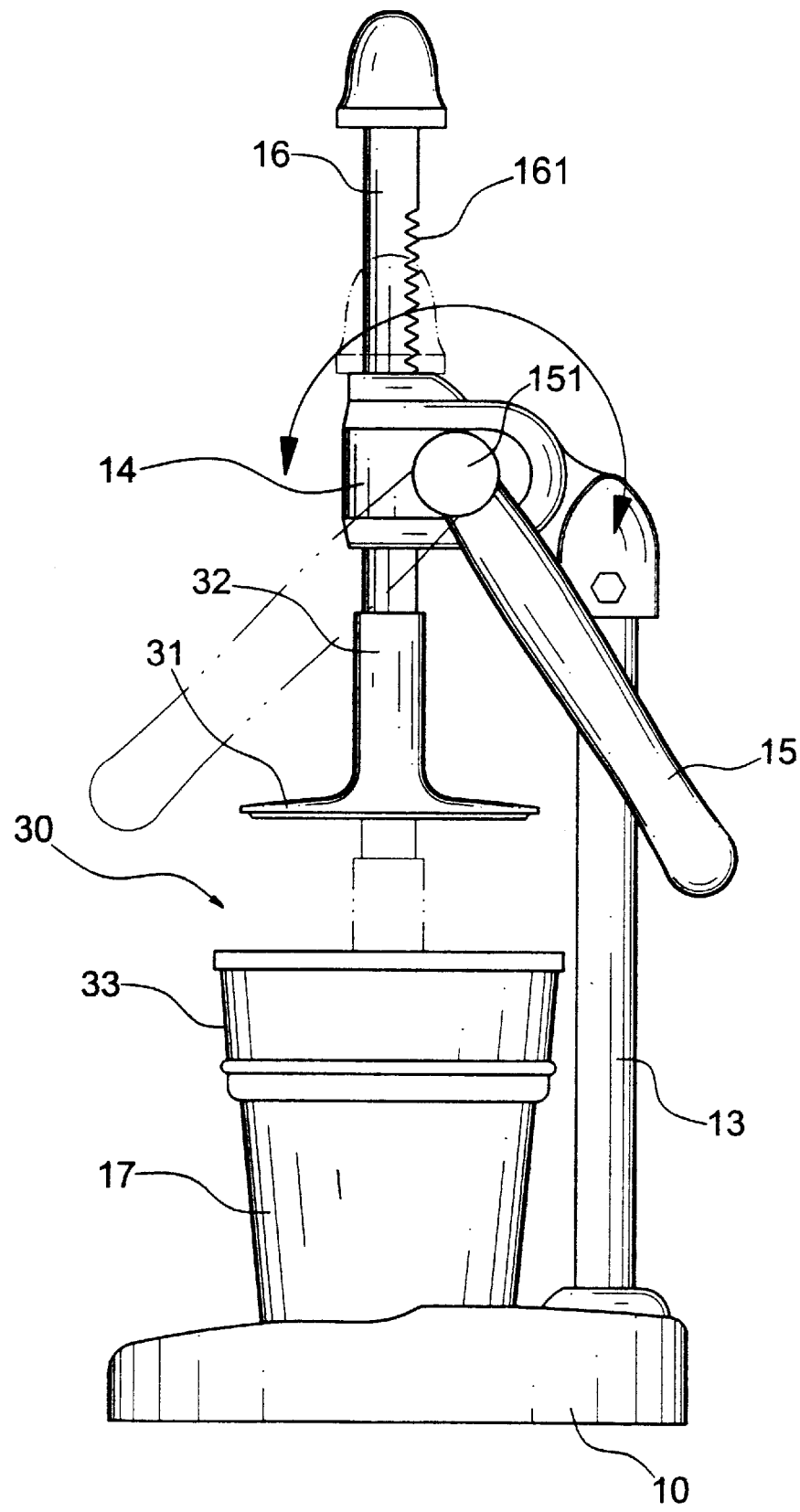
FIG. 12 is a side view similar to FIG. 10, illustrating operation of the juice extractor in accordance with the present invention.

In use, as illustrated in FIG. 11, fruit without peel (such as apples, pineapples, kiwis, etc.), rootstock, or vegetable is placed on top of the dripping plate 34 and the handle 15 is then pivoted to move the vertical rod 16 downward. The pressure plate 31 is moved downward toward the fruit without peel (such as apples, pineapples, kiwis, etc.), rootstock, or vegetable and thus extract juice from the latter, as shown in FIG. 12. The extracted juice flows into the drip cup 17 via the holes 343 in the dripping plate 34.

It is noted that the juicer in FIG. 2 and the juice extractor in FIG. 8 are different from each other in the juicing device 20 in FIG. 2 and the pressing device 30 in FIG. 8. The juicing device 20 is designed for extracting juice from citrus while the pressing device 30 is designed for extracting juice from fruit without peel (such as apples, pineapples, kiwis, etc.), rootstock, or vegetable. Nevertheless, the juicing device 20 and the pressing device 30 can be easily exchanged. For example, when converting the juicer to the juice extractor, one may disengage the pressure cup 21 from the lower threaded end 162 of the vertical rod 16, remove the reamer 25, then place the dripping plate 34 on top of the drip cup 17, and finally engage the pressing plate 30 with the threaded lower end 162 of the vertical rod 16. Conversion of the juice extractor into the juicer can be accomplished by a reverse operation.

Although the invention has been explained in relation to its preferred embodiment, it is to be understood that many other possible modifications and variations can be made without departing from the scope of the invention as hereinafter claimed.

What is claimed is:

1. A juicer/extractor comprising:

a base;

a drip cup supported by the base;

a vertical rod having a lower end located above the drip cup;

means for moving the vertical rod along a vertical direction;

a column extending upward from the base and including a portion for supporting the vertical rod and allowing vertical movement of the vertical rod;

a juicing device for extracting juice from citrus; and a pressing device for extracting juice from fruit without peel, rootstock, or vegetable;

one of the juicing device and the pressing device being releasably mounted between the lower end of the vertical rod and the drip cup.

2. The juicer/extractor as claimed in claim 1, wherein the juicing device comprises a reamer mounted above the drip cup and a pressure cup having a lower end above the reamer and an upper end releasably engaged with the lower end of the vertical rod.

3. The juicer/extractor as claimed in claim 2, wherein the lower end of the vertical rod comprises an outer threading and the upper end of the pressure cup includes an inner threading for engaging with the outer threading of the lower end of the vertical rod.

4. The juicer/extractor as claimed in claim 1, wherein the pressing device comprises a dripping plate mounted on top of the drip cup and a pressing plate having a lower side above the dripping plate and an upper side releasably engaged with the lower end of the vertical rod.

5. The juicer/extractor as claimed in claim 4, wherein the lower end of the vertical rod comprises an outer threading, the pressing plate comprising an engaging stem extending from the upper side thereof, the engaging stem including an end with an inner threading for engaging with the outer threading of the lower end of the vertical rod.

6. The juicer/extractor as claimed in claim 4, wherein the lower side of the pressing plate comprises a plurality of annular ribs formed thereon.

7. The juicer/extractor as claimed in claim 6, wherein the dripping plate comprises a plurality of rows of recessed sections each having a plurality of dripping holes communicated with the drip cup.

8. The juicer/extractor as claimed in claim 5, further comprising a strainer cone surrounding at least a lower portion of the engaging stem to thereby prevent splashing of juice.

* * * * *